US012429343B2

(12) United States Patent
Uemura et al.

(10) Patent No.: US 12,429,343 B2
(45) Date of Patent: Sep. 30, 2025

(54) VEHICLE CONTROL DEVICE AND VEHICLE CONTROL SYSTEM

(71) Applicant: Faurecia Clarion Electronics Co., Ltd., Saitama (JP)

(72) Inventors: Takahiro Uemura, Saitama (JP); Noriaki Aoyama, Saitama (JP); Yuegui Chen, Fujian (CN); Quanbing Li, Guangdong (CN)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 134 days.

(21) Appl. No.: 18/204,460

(22) Filed: Jun. 1, 2023

(65) Prior Publication Data

US 2023/0400311 A1    Dec. 14, 2023

(30) Foreign Application Priority Data

Jun. 8, 2022 (JP) ................. 2022-092725

(51) Int. Cl.
| | |
|---|---|
| *G01C 21/34* | (2006.01) |
| *B60Q 1/48* | (2006.01) |
| *B60W 30/06* | (2006.01) |
| *G01C 21/36* | (2006.01) |
| *G06F 3/04845* | (2022.01) |

(52) U.S. Cl.
CPC .......... *G01C 21/3415* (2013.01); *B60Q 1/48* (2013.01); *G01C 21/3611* (2013.01); *B60W 30/06* (2013.01); *G06F 3/04845* (2013.01)

(58) Field of Classification Search
CPC .. G01C 21/3415; G01C 21/3611; B60Q 1/48; B60W 30/06; G06F 3/04845; B62D 15/0285
See application file for complete search history.

(56) References Cited

U.S. PATENT DOCUMENTS

| 10,974,765 B2* | 4/2021 | Kim .................. B62D 15/0265 |
| 2005/0049767 A1* | 3/2005 | Endo ................. B62D 15/0285 |
| | | 348/148 |

(Continued)

FOREIGN PATENT DOCUMENTS

| EP | 1 916 177 A2 | 4/2008 |
| EP | 3 865 377 A1 | 8/2021 |
| JP | 2020-131897 A | 8/2020 |

OTHER PUBLICATIONS

The extended European Search Report mailed by European Patent Office dated on Oct. 9, 2023 in corresponding European patent application No. 23177486.0-1009.

*Primary Examiner* — Anne Marie Antonucci
*Assistant Examiner* — Patrick Daniel Mohl
(74) *Attorney, Agent, or Firm* — IP Business Solutions, LLC

(57) ABSTRACT

A vehicle control device includes a route generating unit, a communication control unit, and a projection control unit. The route generating unit generates a parking lot leaving route of a vehicle based on sensing results of a sensor group mounted on the vehicle. The communication control unit transmits the parking lot leaving route to an information processing device and receives a stop position where the vehicle stops from the information processing device. The projection control unit projects light emitted from a light source at a position on a road surface corresponding to the stop position.

2 Claims, 10 Drawing Sheets

(56) References Cited

U.S. PATENT DOCUMENTS

| | | | |
|---|---|---|---|
| 2008/0129544 A1* | 6/2008 | Augst | B62D 15/0285 |
| | | | 340/932.2 |
| 2019/0166338 A1* | 5/2019 | Greenwood | B60Q 1/305 |
| 2020/0269748 A1 | 8/2020 | Mimura et al. | |
| 2023/0202462 A1* | 6/2023 | Fujiwara | G05D 1/0016 |
| | | | 340/932.2 |
| 2024/0336283 A1* | 10/2024 | Sakai | B60W 60/00 |

\* cited by examiner

VEHICLE CONTROL DEVICE AND VEHICLE CONTROL SYSTEM

CROSS-REFERENCE TO RELATED APPLICATIONS

The present application claims priority under 35 U.S.C. § 119 to Japanese Patent Application No. 2022-092725 filed on Jun. 8, 2022. The content of the application is incorporated herein by reference in its entirety.

BACKGROUND OF THE INVENTION

Field of the Invention

The present invention relates to a vehicle control device and a vehicle control system.

Description of the Related Art

Patent Document 1 discloses a vehicle travel route display method in which, when a vehicle VO having an autonomous travel control function is caused to travel by autonomous travel control or by autonomous travel control based on a remote operation from outside of the vehicle VO, a travel route that causes the vehicle VO to travel by autonomous travel control is set, a display pattern Pt1 indicating the travel route is generated, and the display pattern Pt1 indicating the travel route is visibly displayed on a road surface in a travel direction of the vehicle VO.

PRIOR ART DOCUMENTS

Patent Documents

[Patent Document 1] Japanese Patent Application 2020-131897

Problem Solved by the Present Invention

However, during autonomous driving, when a user sets a stop position where a vehicle leaving a parking lot from a parking position is to stop using an information processing device, the user may not be able to accurately recognize a position at which the vehicle actually stops at the stop position displayed by the information processing device. Therefore, there is demand for a technique for accurately notifying the user of the stop position of the vehicle.

SUMMARY OF THE INVENTION

In light of the foregoing, an object of the present invention is to provide a vehicle control device and a vehicle control system capable of accurately providing notification of a stop position of a vehicle leaving a parking lot by autonomous driving.

One aspect of the present invention provides a vehicle control device, including: a route generating unit that generates a parking lot leaving route of a vehicle based on sensing results of a sensor mounted on the vehicle; a communication control unit that transmits the parking lot leaving route to an external device and receives a stop position where the vehicle will stop from the external device; and a projection control unit that projects light emitted from a light source onto a position on a road surface corresponding to the stop position.

Effect of the Invention

The present invention can accurately provide notification of a stop position for a vehicle leaving a parking lot by autonomous driving.

DETAILED DESCRIPTION OF THE INVENTION

[1. System Configuration of Vehicle Control System]

Hereinafter, embodiments will be described with reference to the accompanying drawings.

Figure 1:
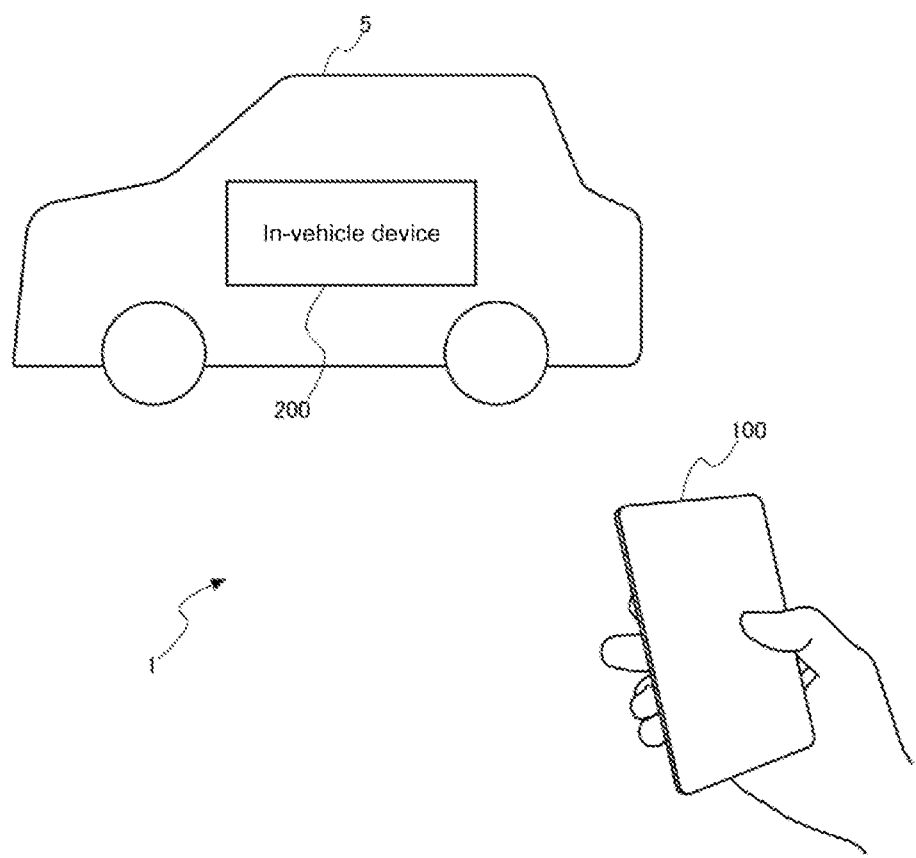
FIG. 1 is a system configuration diagram of a vehicle control system.

FIG. 1 is a system configuration diagram of a vehicle control system 1.

The vehicle control system 1 includes an information processing device 100 and an in-vehicle device 200 mounted on a vehicle 5. Examples of the information processing device 100 can be a smartphone or a tablet personal computer. The information processing device 100 corresponds to an external device.

The information processing device 100 and the in-vehicle device 200 are wirelessly connected together by short-range wireless communication such as Bluetooth, Wi-Fi, or the like, and can perform data communication with each other. Bluetooth and Wi-Fi are registered trademarks.

The in-vehicle device 200 includes a vehicle control device 270 illustrated in FIG. 3 to be described later. The vehicle control device 270 generates route information that is information on a route on which the vehicle 5 leaves a parking lot from a parking position where the vehicle has parked, and transmits the generated route information to the information processing device 100.

The information processing device 100 receives a selection of a stop position where the vehicle 5 will stop based on the route information received from the in-vehicle device 200. The information processing device 100 transmits the received information on the stop position to the in-vehicle device 200. The in-vehicle device 200 performs control such that the vehicle 5 travels to the stop position received from the information processing device 100.

[2. Configuration of Information Processing Device]

Figure 2:
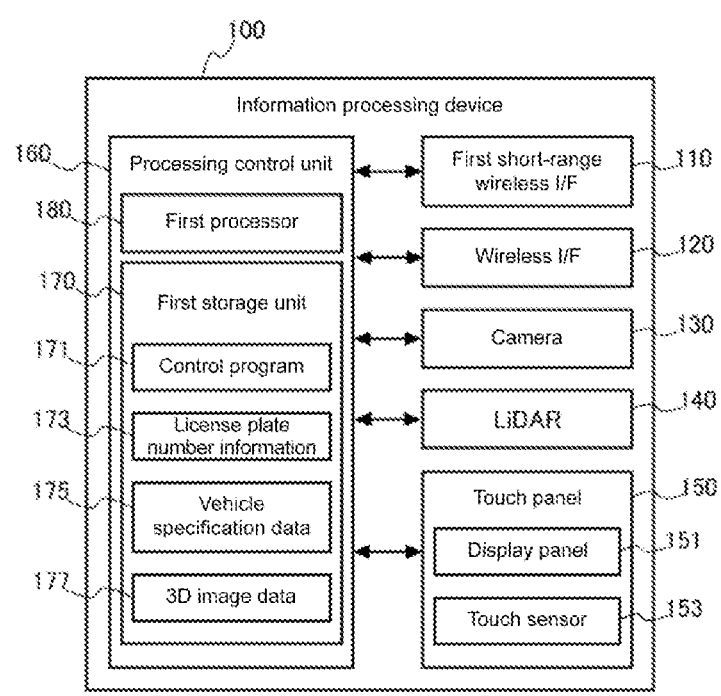
FIG. 2 is a block diagram illustrating a configuration of an information processing device.

FIG. 2 is a block diagram illustrating a configuration of an information processing device 100.

A configuration of the information processing device 100 will be described with reference to FIG. 2.

The information processing device 100 includes a first short-range wireless interface 110, a wireless I/F 120, a camera 130, a light detection and ranging device (Lidar) 140, a touch panel 150, and a processing control unit 160. Hereinafter, the term interface is abbreviated as I/F. The camera 130 corresponds to an imaging unit, and the touch panel 150 corresponds to an operating unit and a display unit.

The first short-range wireless I/F 110 includes an antenna and a wireless communication circuit, and performs short-range wireless communication with an external device such as the in-vehicle device 200, or the like.

The wireless I/F 120 includes an antenna and a wireless communication circuit, and is connected to a network such as the Internet or the like by Wi-Fi communication. The wireless I/F 120 performs mutual data communication with a server device on a network. An illustration of the server device is omitted.

The wireless I/F 120 downloads an application program, which will be described later, and 3D image data, or the like, from a server device. Hereinafter, the application program is also simply referred to as an app.

The camera 130 includes an imaging lens and an imaging element such as a charge coupled device (CCD), a complementary MOS (CMOS), or the like, performs imaging in response to instructions from the processing control unit 160 or an operation by a user, and generates a captured image. An illustration of the imaging lens and the imaging element is omitted. The camera 130 outputs the generated captured image to the processing control unit 160 as sensor data. The first storage unit 170 temporarily stores the captured image captured by the camera 130.

A light detection and ranging device (LiDAR) 140 detects detection information such as shape, position, distance, and the like of an obstacle present near the information processing device 100. The LiDAR 140 emits detection light such as laser light or the like, and detects detection information based on elapsed time from the emission of the detection light until reception of the reflected light of the detection light reflected by an obstacle. The LiDAR 140 outputs the detected detection information to the processing control unit 160 as sensor data.

The touch panel 150 includes a display panel 151 such as a liquid crystal panel, organic electro-luminescence (EL) panel, or the like, and a touch sensor 153. The touch sensor 153 outputs coordinate information indicating a position on the display panel 151 where the touch operation is detected, to the processing control unit 160.

The processing control unit 160 is a computer device including a first storage unit 170 and a first processor 180. The processing control unit 160 corresponds to a control unit.

The first storage unit 170 includes read only memory (ROM) and random access memory (RAM). The first storage unit 170 may be configured to include an auxiliary storage device such as a universal serial bus (USB) memory, an SD card, or the like.

The ROM stores a control program 171, license plate number information 173, vehicle specification data 175, 3D image data 177, and the like. The RAM is used as a calculating region of the first processor 180.

The control program 171 includes an application program, an operating system (OS), and the like.

The app stored in the ROM includes a parking lot leaving support app. The parking lot leaving support app supports the vehicle 5 leaving the parking lot. The operation of the parking lot leaving support app will be described later in detail.

The license plate number information 173 is information of a number written on a license plate of the vehicle 5 on which the in-vehicle device 200 is mounted. The license plate number information 173 is, for example, information input by the user through a touch operation on the touch panel 150.

The vehicle specification data 175 is data related to the vehicle 5 on which the in-vehicle device 200 is mounted, and includes, for example, information on vehicle length, vehicle width, distance from a preset specific site to a center of the vehicle, and the like. The center of the vehicle is, for example, the center in the vehicle length direction and the vehicle width direction of the vehicle 5. Examples of the specific site include the license plate, a headlight, a side mirror, and the like.

The 3D image data 177 is a three dimensional image for displaying a vehicle image corresponding to the vehicle 5 on the touch panel 150. The vehicle image corresponding to the vehicle 5 is, for example, a three dimensional image of a vehicle of the same vehicle type and the same color as the vehicle 5.

The application program and the three-dimensional image data 177 are downloaded by the processing control unit 160 from the server device via, for example, a wireless I/F 120.

The first processor 180 is an arithmetic processing device including a processor such as a central processing unit (CPU), a micro processor unit (MPU), or the like. The first processor 180 may be configured by a single processor, or may be configured by a plurality of processors. In addition, the first processor 180 may be configured by a system-on-a-chip (SoC) that integrates a part or all of the first storage unit 170 and other circuits. In addition, the first processor 180 may be configured by a combination of a CPU that executes a program and a digital signal processor (DSP) that executes prescribed arithmetic processing. Furthermore, all of the functions of the first processor 180 may be implemented by hardware, or may be configured using a programmable device.

[3. Configuration of in-Vehicle Device]

Figure 3:
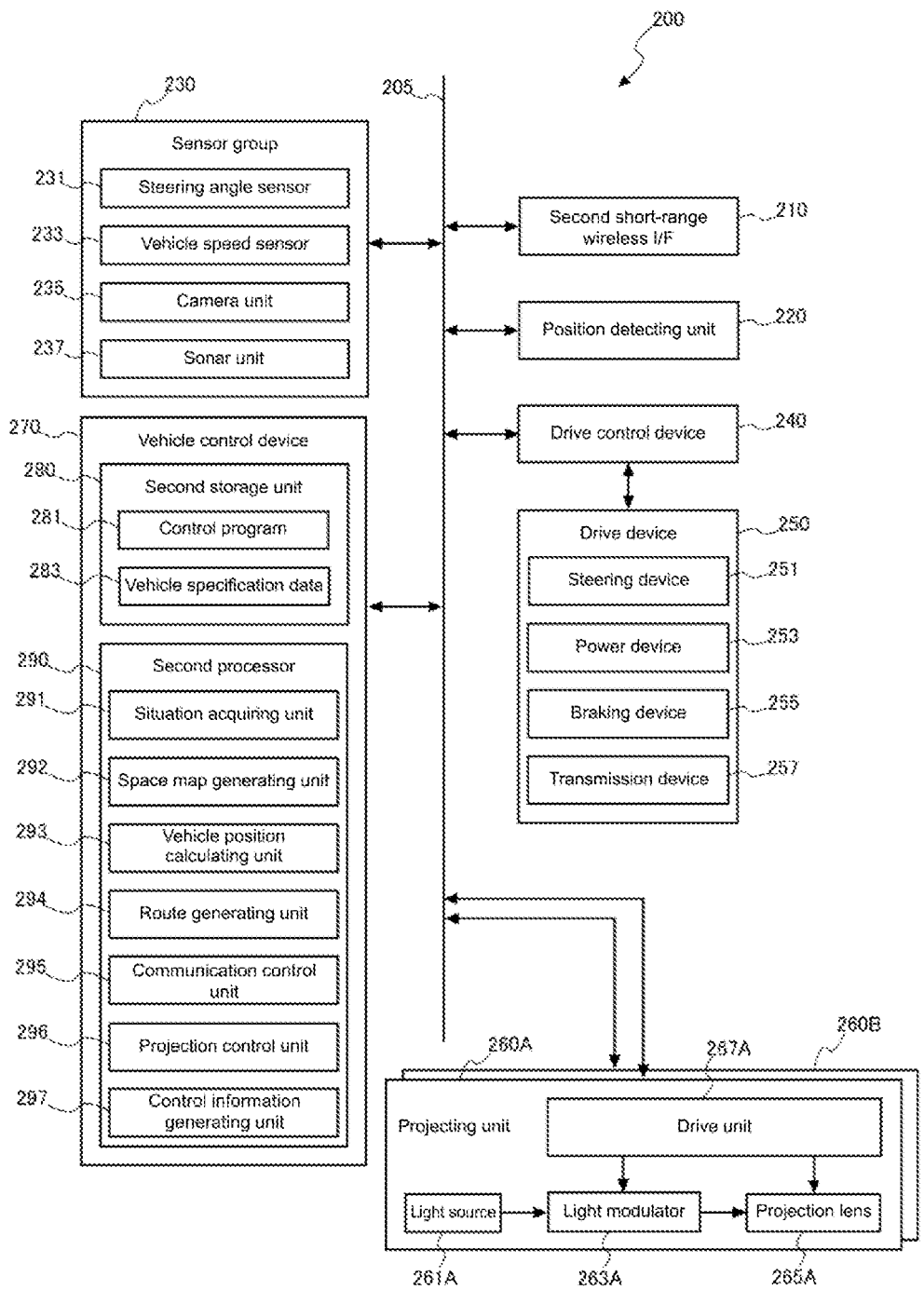
FIG. 3 is a block diagram illustrating a configuration of an in-vehicle device.

FIG. 3 is a block diagram illustrating a configuration of the in-vehicle device 200. The configuration of the in-vehicle device 200 will be described with reference to FIG. 3.

The in-vehicle device 200 includes a second short-range wireless I/F 210, a position detecting unit 220, a sensor group 230, a drive control device 240, a projecting unit 260, and a vehicle control device 270. These devices are connected to each other via a communication bus 205 conforming to a standard such as Ethernet (registered trademark), CAN (Controller Area Network), LIN (Local Interconnect Network), or the like so as to be able to perform mutual data communication.

The second short-range wireless I/F 210 includes an antenna and a wireless communication circuit, and performs short-range wireless communication with an external device such as the information processing device 100, or the like.

The position detecting unit 220 detects the position of the vehicle 5. The position detecting unit 220 includes a global navigation satellite system (GNSS) receiver and a processor. An illustration of the GNSS receiver and the processor is omitted. The GNSS receiver receives a satellite signal transmitted from a satellite. The processor calculates a latitude and a longitude which are position information of the vehicle 5 based on the satellite signal received by the GNSS receiver, and calculates a direction of the vehicle 5 based on a difference between the calculated position information. The position detecting unit 220 outputs position information and direction information of the vehicle 5 obtained by calculation to the vehicle control device 270.

The sensor group 230 includes a plurality of sensors that detect a state of the vehicle 5 and a situation around the vehicle 5. The sensor group 230 corresponds to a sensor. The sensor group 230 includes a steering angle sensor 231, a vehicle speed sensor 233, a camera unit 235, and a sonar unit 237 as sensors.

The sensor group 230 outputs sensor data indicating sensing results to the vehicle control device 270. The vehicle control device 270 temporarily stores the sensor data in the second storage unit 280.

The steering angle sensor 231 detects a steering angle of a steering wheel of the vehicle 5.

The vehicle speed sensor 233 detects a vehicle speed of the vehicle 5.

The camera unit 235 includes an imaging lens and an imaging element, and is installed on each of the front, rear, left, and right sides of the vehicle 5. The camera unit 235 captures an image of the surroundings of the vehicle 5 and generates a captured image.

The sonar unit 237 is installed, for example, in each of the front, rear, left, and right directions of the vehicle 5, and detects a distance, a direction, and the like to obstacles existing around the vehicle 5 using ultrasonic waves.

The drive control device 240 is a computer device such as an ECU (Electronic Control Unit) or the like having a storage unit and a processor.

The drive control device 240 controls the drive device 250 based on the control information input from the vehicle control device 270. The drive device 250 includes a steering device 251, a power device 253, a braking device 255, and a transmission device 257.

The steering device 251 is a device including an actuator that steers the steered wheels of the vehicle 5. The drive control device 240 drives the actuator in accordance with the control information, and steers the steered wheels of the vehicle 5.

The power device 253 is a device including an actuator that adjusts the driving force of the drive wheels of the vehicle 5. The actuator corresponds to a throttle actuator when the power source of the vehicle 5 is an engine, and corresponds to a motor when the power source is a motor. The drive control device 240 drives the actuator in accordance with the control information, and controls the vehicle 5 to travel.

The braking device 255 is a device including an actuator that controls a brake system provided in the vehicle 5 in accordance with the control information, and controls a braking force applied to a wheel of the vehicle 5. The drive control device 240 controls the actuator in accordance with the control information, and applies a braking force to the wheel of the vehicle 5.

The transmission device 257 is a device including a transmission and an actuator. The transmission device 257 drives the actuator to control a shift position of the transmission, and switches a transmission gear ratio of the transmission, as well as forward and backward movement of the vehicle 5. The drive device 250 controls the actuator to change the shift position of the transmission device 257.

The projecting unit 260 includes a projecting unit 260A and a projecting unit 260B. The projecting unit 260A is provided in the headlight on the left side when facing the vehicle 5, and the projecting unit 260B is provided in the headlight on the right side when facing the vehicle 5. Since the projecting unit 260A and the projecting unit 260B have the same configuration, the configuration of the projecting unit 260A will be described below. Further, the projecting unit 260A and the projecting unit 260B are collectively referred to as the projecting unit 260.

The projecting unit 260A includes a light source 261A, a light modulator 263A, a projection lens 265A, and a drive unit 267A.

The light source 261A includes a light source such as a light-emitting diode (LED) or the like, for example.

The light modulator 263A includes a light modulation element capable of changing the transmittance of light incident from the light source 261A. The drive unit 267A controls the transmittance of the light modulation element in accordance with the control of the vehicle control device 270 to change the transmittance of the light from the light source 261A. The drive unit 267A controls the light modulator 263A to control the range of light output from the light modulator 263A. The light modulation element is not limited to a transmissive light modulation element, and may be, for example, a reflective light modulation element, or a digital micromirror device (DMD).

The projection lens 265A is a lens that projects the light output from the light modulator 263A onto a road surface. The drive unit 267A drives the projection lens 265A in accordance with the control of the vehicle control device 270, and changes the position on the road surface where the projection lens 265A projects the projection light.

The vehicle control device 270 is, for example, a computer device such as an ECU or the like, and includes a second storage unit 280 and a second processor 290.

The second storage unit 280 includes ROM and RAM. The second storage unit 280 may be configured of non-volatile semiconductor memory such as flash memory or the like.

The ROM stores a control program 281 and vehicle specification data 283.

The RAM is used as a calculating region by the second processor 290.

The second processor 290 is an arithmetic processing device including a processor such as a CPU, MPU, or the like. The second processor 290 may be configured by a single processor or by a plurality of processors. In addition, the second processor 290 may be configured by an SoC that integrates a portion or all of the second storage unit 280 and other circuits. In addition, the second processor 290 may be configured by a combination of a CPU that executes a program and a DSP that executes prescribed arithmetic processing. Furthermore, all of the functions of the second processor 290 may be implemented by hardware, or may be configured using a programmable device.

The vehicle control device 270 includes, as a functional configuration, a situation acquiring unit 291, a space map generating unit 292, a vehicle position calculating unit 293, a route generating unit 294, a communication control unit 295, a projection control unit 296, and a control information generating unit 297. These functional configurations are functions achieved by the second processor 290 executing a computer program and performing arithmetic operations.

The situation acquiring unit 291 instructs the sensor group 230 to start sensing. The situation acquiring unit 291 temporarily stores the sensor data input from the sensor group 230 in the second storage unit 280.

The space map generating unit 292 generates a space map indicating a situation around the vehicle 5 based on the position information and the direction information input from the position detecting unit 220, the captured image input from the camera unit 235, and the sensor data input from the sonar unit 237.

In the space map, information such as distance, direction, and the like to an obstacle existing near the vehicle 5 is recorded. The obstacles recorded in the space map include other vehicles and structures such as columns in a parking lot, or the like.

When the vehicle 5 starts traveling, the vehicle position calculating unit 293 calculates the position of the vehicle 5 based on the position information and the direction information input from the position detecting unit 220 and the sensor data of the steering angle sensor 231 and the vehicle speed sensor 233.

The route generating unit 294 generates route information that is information on a route along which the vehicle 5 travels, based on the space map generated by the space map generating unit 292. The route information corresponds to the parking lot leaving route. When a plurality of pieces of route information can be generated, the route generating unit 294 generates a plurality of pieces of route information. The route generating unit 294 may generate range information indicating a range in which the vehicle 5 travels, instead of the route information.

The communication control unit 295 controls the second short-range wireless I/F 210 to mutually perform data communication with the information processing device 100.

The communication control unit 295 transmits the route information generated by the route generating unit 294 to the information processing device 100. The communication control unit 295 also receives projection instructions and travel instructions from the information processing device 100. The projection instructions are instructions to project the projection light indicating the stop position set by the user onto the road surface. The travel instructions are instructions for the vehicle 5 to travel to the stop position set by the user. The communication control unit 295 outputs the received projection instructions and travel instructions to the projection control unit 296 and the control information generating unit 297.

The projection control unit 296 acquires the information of the stop position from the communication control unit 295, and determines the projection position and the projection range where the projection light is projected based on the size and the orientation the vehicle at the stop position. The projection control unit 296 controls the drive unit 267 to project the projection light in the determined projection position and projection range.

The control information generating unit 297 inputs the selected route information and the information of the stop position from the communication control unit 295. The control information generating unit 297 generates control information for causing the vehicle 5 to travel from the parking position to the stop position based on the input information, and outputs the generated control information to the drive control device 240.

The drive control device 240 controls driving of the drive device 250 based on the control information input from the vehicle control device 270, and performs control such that the vehicle 5 travels to the stop position in accordance with the route information.

[4. Operation of Vehicle Control System]

Next, operation of the vehicle control system 1 will be described.

When receiving a user operation, the processing control unit 160 activates the parking lot leaving support app and starts the parking lot leaving support for the vehicle 5.

First, the processing control unit 160 controls the first short-range wireless I/F 110 to connect the information processing device 100 and the in-vehicle device 200 by short-range wireless communication.

Next, the processing control unit 160 instructs the camera 130 to start imaging, and acquires the captured image generated by the camera 130 from the first storage unit 170. The processing control unit 160 analyzes the acquired captured image and detects the license plate number of the vehicle 5 captured in the captured image. The processing control unit 160 determines whether or not the detected license plate number matches the license plate number information 173 stored in the first storage unit 170.

When the detected license plate number does not match the license plate number information 173, the processing control unit 160 acquires another captured image from the first storage unit 170, detects the license plate number from the acquired captured image, and determines again whether or not the detected license plate number matches the license plate number information 173.

When the vehicle 5 of the user is detected, the processing control unit 160 calculates coordinates indicating the position of the information processing device 100 based on the captured image of the camera 130 and the sensor data of the LiDAR 140.

First, the processing control unit 160 detects a specific site of the vehicle 5 captured in the captured image. Examples of the specific site include a license plate, a headlight, a side mirror, and the like, as described above. The processing control unit 160 acquires the distance and the direction to the detected specific site of the vehicle from the information processing device 100. For example, the processing control unit 160 acquires the distance and the direction to the specific site of the vehicle 5 from the information processing device 100 based on the sensor data of the LiDAR 140.

Next, the processing control unit 160 calculates the distance and the direction from the specific site of the vehicle 5 to the center of the vehicle 5 based on the vehicle specification data 175. When the distance and the direction from the information processing device 100 to the center of the vehicle 5 are specified, the processing control unit 160 sets a coordinate system having the center of the vehicle as an origin, and calculates coordinates indicating the position of the information processing device 100 in the set coordinate system.

Figure 4:
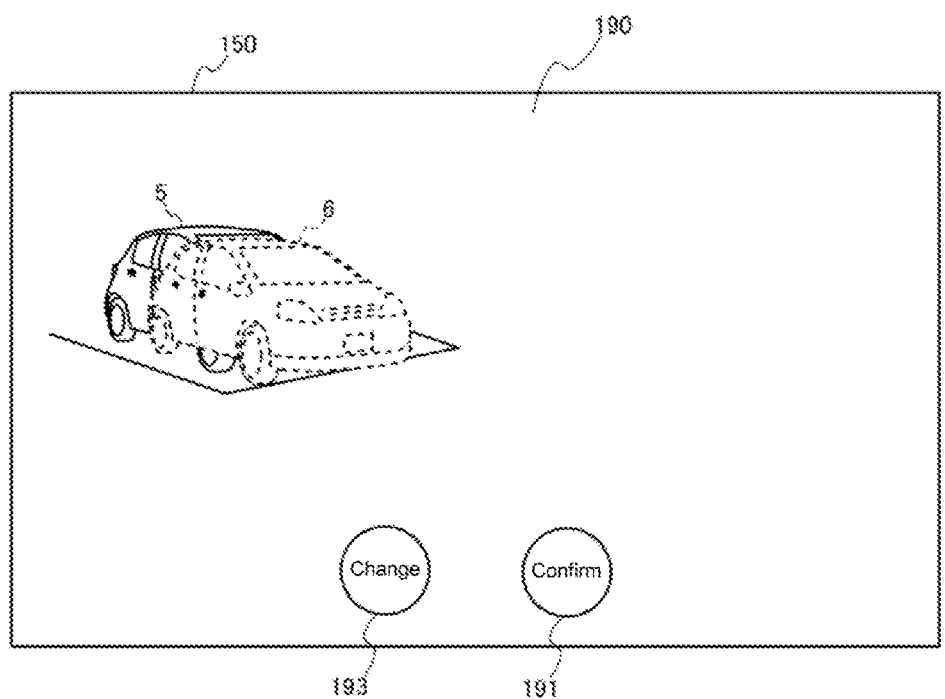
FIG. 4 is a diagram illustrating an example of a display on a touch panel.

FIG. 4 is a diagram illustrating an example of a display on the touch panel 150.

Next, the processing control unit 160 generates a three dimensional image of the vehicle 5 based on the 3D image data 177, and superimposes the generated three dimensional image of the vehicle 5 on the captured image of the camera 130. The three dimensional image of the vehicle 5 is hereinafter referred to as a 3D vehicle image 6. An image obtained by superimposing the 3D vehicle image 6 on the captured image is referred to as a display image 190.

The processing control unit 160 performs control to display the generated display image 190 on the touch panel 150.

FIG. 4 illustrates a display image 190 in which a portion of the 3D vehicle image 6 is superimposed on the vehicle 5 captured in the captured image. The display image 190 includes a confirmation button 191 and a change button 193 in addition to the 3D vehicle image 6. The confirmation button 191 is a button for confirming a stop position at which the vehicle 5 stops. The change button 193 is a button for changing the set stop position.

Figure 5:
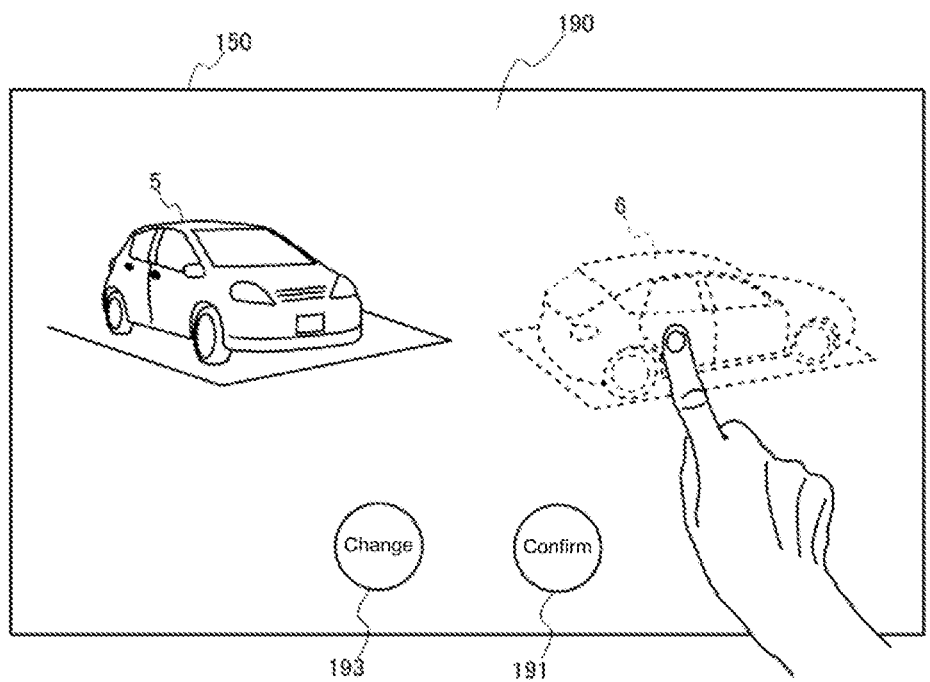
FIG. 5 is a diagram illustrating an example of a display on a touch panel.

FIG. 5 is a diagram illustrating an example of a display on the touch panel 150. In particular, FIG. 5 is a diagram illustrating a state in which the display position of the 3D vehicle image 6 displayed in the display image 190 is changed by a touch operation.

When the display image 190 is displayed on the touch panel 150, the user performs a touch operation of touching the 3D vehicle image 6 with a finger and moving the touching finger to a stopping position where the vehicle 5 will stop. At this time, when the position of the finger moved by the touch operation is not on the route indicated by the route information received from the vehicle control device 270, the processing control unit 160 does not accept the touch operation. In other words, the 3D vehicle image 6 returns to the position before the touch operation. As a result, a position where the vehicle 5 cannot travel due to an obstacle or the like is not selected as the stop position.

When the position of the finger moved by the touch operation is on the route indicated by the route information received from the vehicle control device 270, the processing control unit 160 displays the 3D vehicle image 6 at the position of the finger after the movement by the touch operation.

When the user changes the position of the 3D vehicle image 6 moved by the touch operation again, the user presses the change button 193. When the change button 193 is pressed, the processing control unit 160 receives a change in the position of the 3D vehicle image 6 by a touch operation.

After determining the stop position, the user presses the confirmation button 191. When the confirmation button 191 is pressed, the processing control unit 160 calculates information on a stopping position indicating a position at which the vehicle 5 stops on the route indicated by the route information based on the moving amount and the moving direction of the 3D vehicle image 6 on the touch panel 150. Next, the processing control unit 160 transmits the projection instructions and the travel instructions to the vehicle control device 270. The travel instructions include route information selected by the user and information on a stop position at which the vehicle 5 stops on a route indicated by the route information.

When receiving the projection instructions and the travel instructions from the information processing device 100, the vehicle control device 270 determines the projection position and the projection range in which the projection light is projected based on the size and the orientation of the vehicle 5 at the stop position indicated by the information of the stop position included in the travel instructions.

The vehicle control device 270 controls the drive unit 267 to project the projection light in the determined projection position and projection range. Since the projection light is projected at the stop position where the vehicle 5 actually stops, the user can confirm the stop position where the vehicle 5 stops by the projection light.

Next, the vehicle control device 270 generates control information for causing the vehicle 5 to travel from a parking position to the stop position based on the route information and the information on the stop position included in the travel instructions. The vehicle control device 270 transmits the generated control information to the drive control device 240. As a result, the vehicle 5 starts traveling by autonomous driving and moves from the parking position to the stop position.

Figure 6:
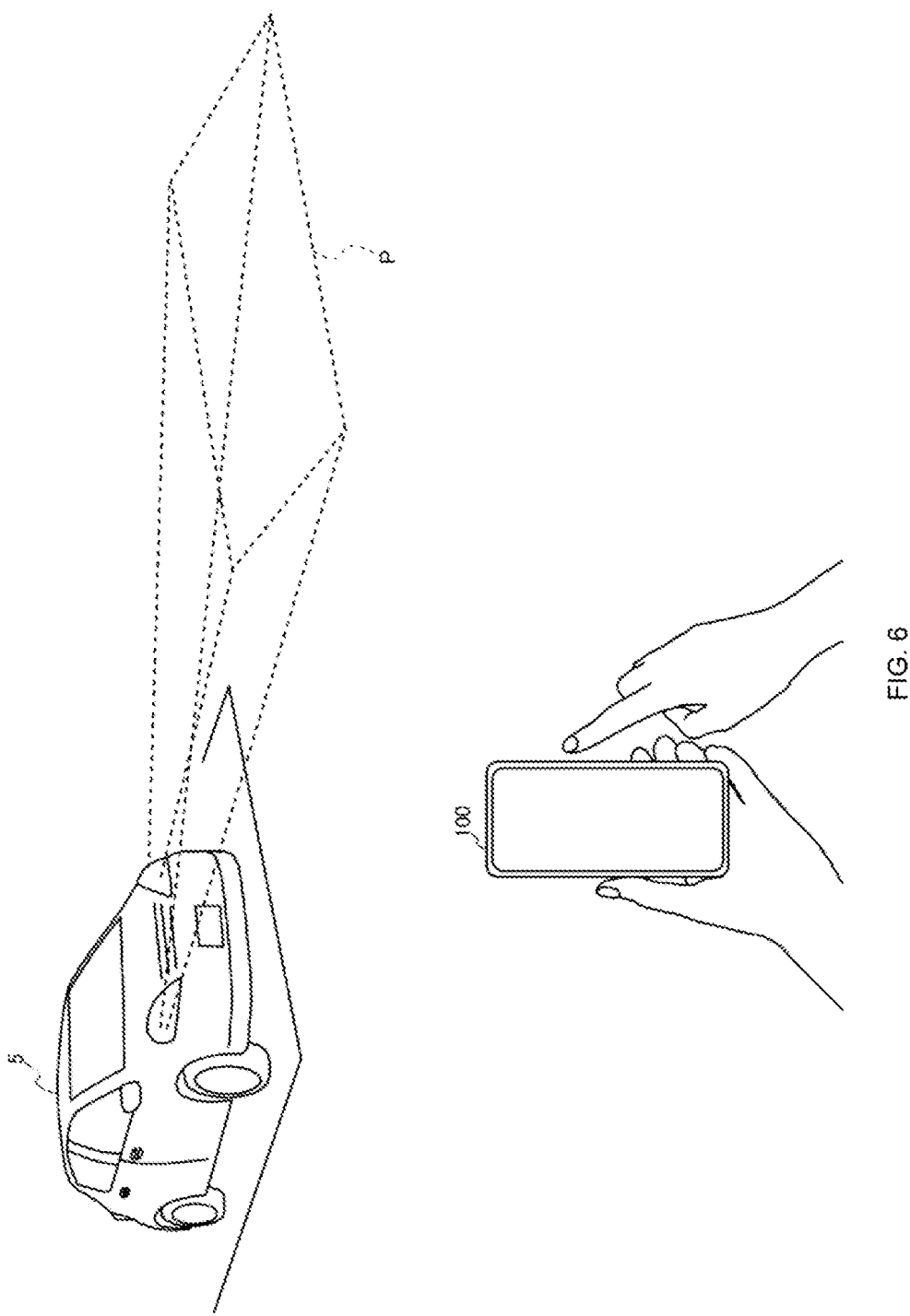
FIG. 6 is a diagram illustrating a state in which projection light is projected at a stop position selected by a user.

FIG. 6 is a diagram showing a state in which the projection light is projected at the stop position P selected by the user.

Figure 7:
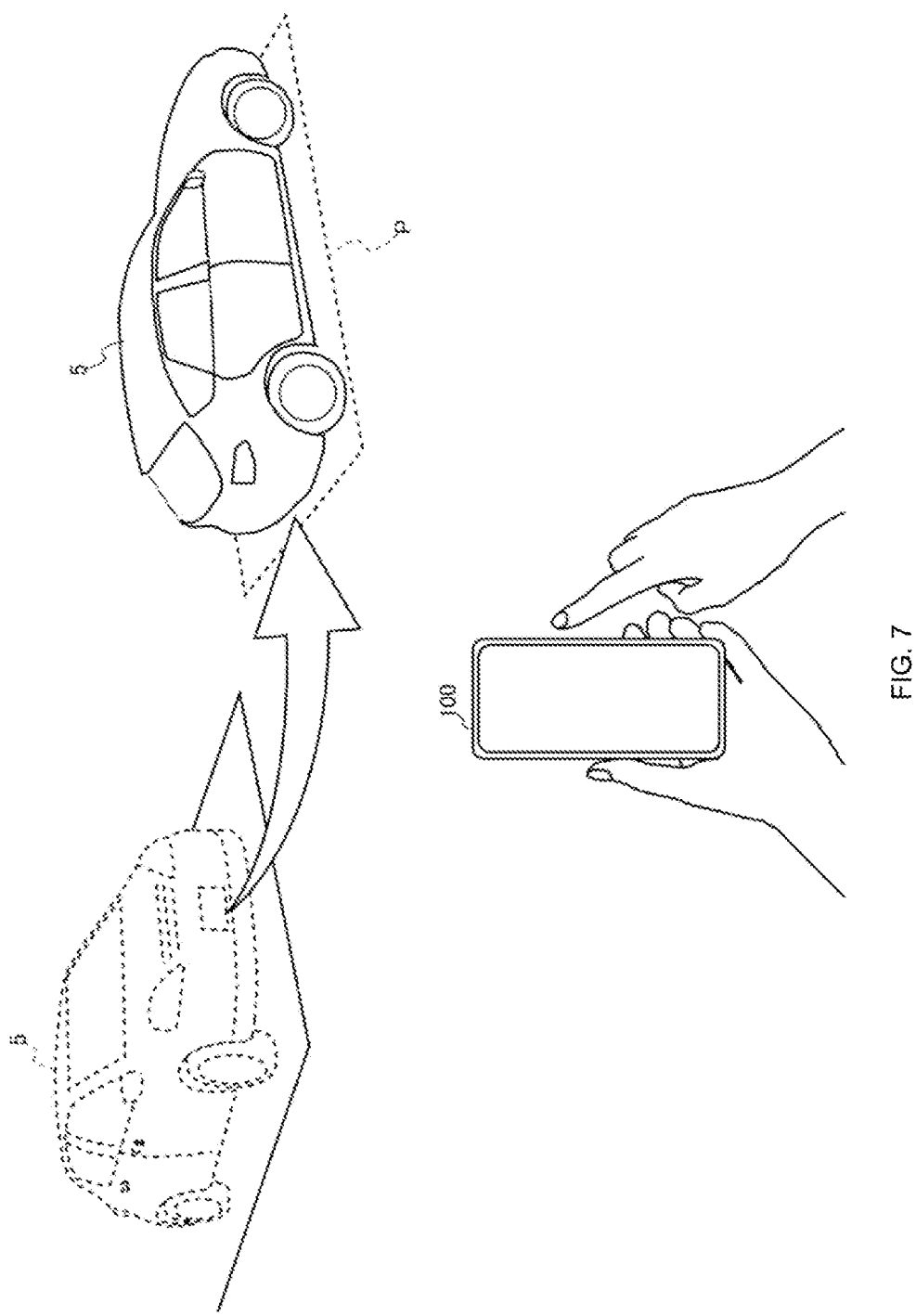
FIG. 7 is a diagram illustrating a state in which a vehicle has moved to a stop position indicated by the projection light.

FIG. 7 is a diagram showing a state in which the vehicle 5 has moved to the stop position P indicated by the projection light. Even when the vehicle 5 is traveling from the parking position to the stop position P, the projecting unit 260 projects the projection light at a constant position. Therefore, the user and other people near the vehicle 5 can recognize the position where the vehicle 5 will move based on the projection light.

Figure 8:
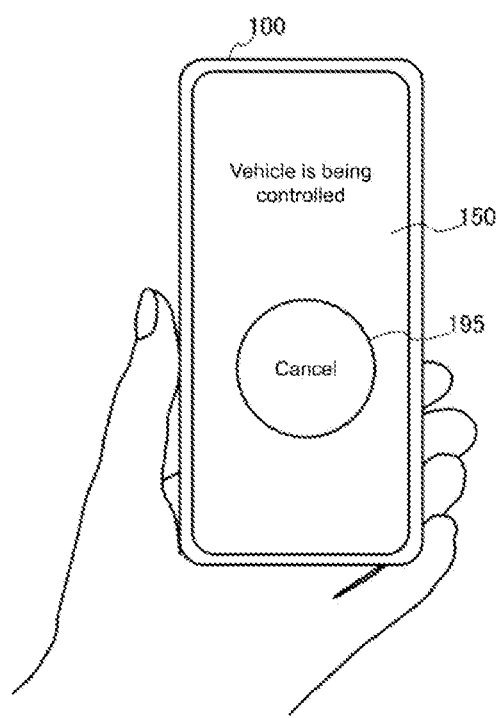
FIG. 8 is a diagram illustrating an example of a display on a touch panel.

FIG. 8 is a diagram showing a display screen on the touch panel 150 when the vehicle 5 is moving along the route of the route information.

As shown in FIG. 8, a cancel button 195 is displayed on the touch panel 150 of the information processing device 100. The cancel button 195 is a button for stopping travel of the vehicle 5. When the user wants to stop travel of the vehicle 5, the user presses the cancel button 195. When the cancel button 195 is pressed, the processing control unit 160 transmits a signal indicating an instruction to stop control of the vehicle 5 to the vehicle control device 270.

When the vehicle control device 270 receives a signal from the information processing device 100 indicating an instruction to stop the vehicle 5, the vehicle control device instructs the drive control device 240 to stop travel of the vehicle 5. When instructed to stop travel, the drive control device 240 controls the power device 253 to stop driving the drive wheels, and controls the braking device 255 to apply a braking force to the wheels of the vehicle 5.

Figure 9:
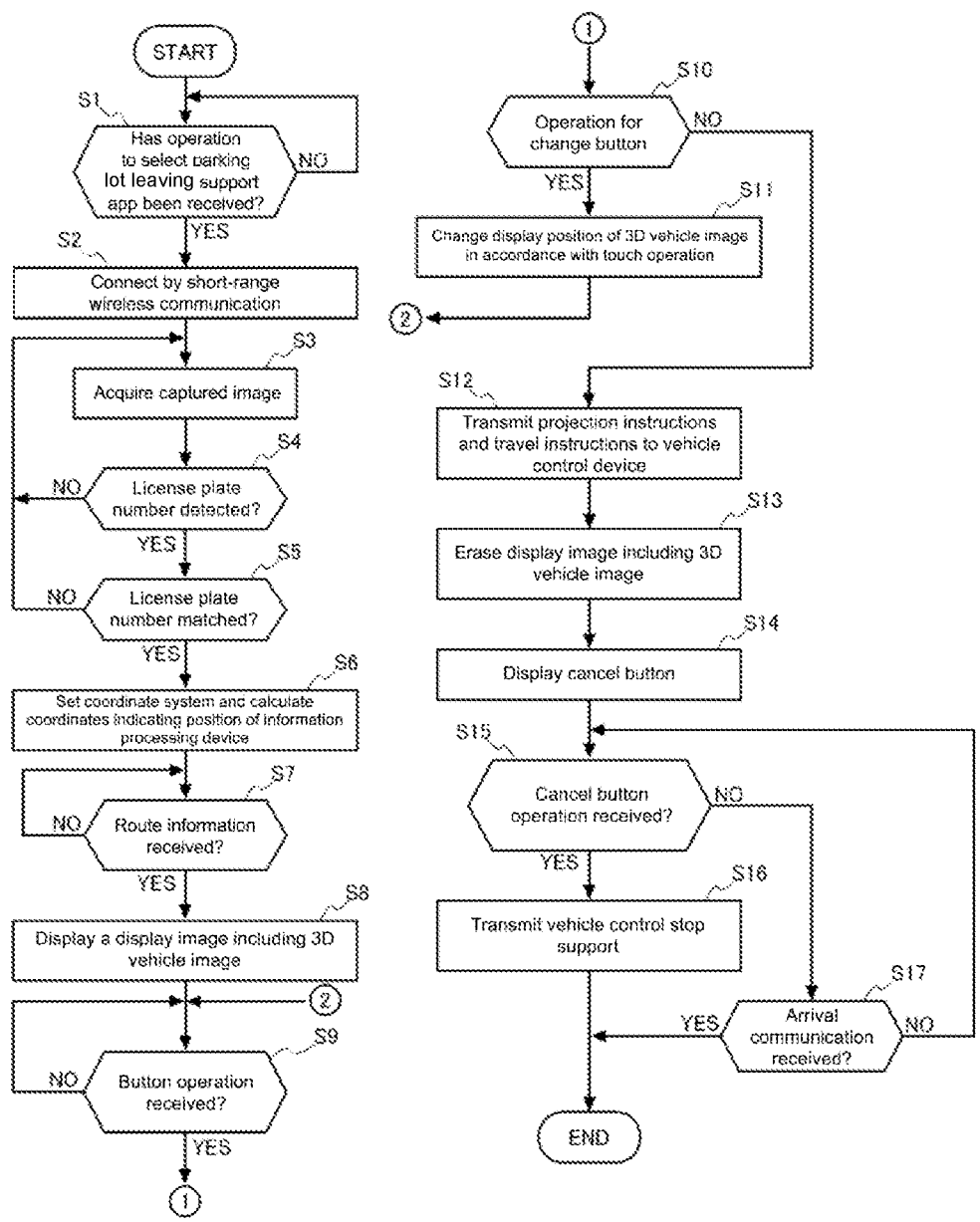
FIG. 9 is a flowchart showing an operation of the information processing device.

FIG. 9 is a flowchart showing the operation of the information processing device 100.

The operation of the information processing device 100 will be described with reference to the flowchart shown in FIG. 9.

First, the processing control unit 160 determines whether or not an operation of selecting the parking lot leaving support app has been received (step S1). If an operation of selecting the parking lot leaving support app has not been received (step S1/NO), the processing control unit 160 stands by until the parking lot leaving support app has been selected.

If the parking lot leaving support app has been selected (step S1/YES), the processing control unit 160 controls the first short-range wireless I/F 110 to connect the information processing device 100 to the in-vehicle device 200 by short-range wireless communication (step S2).

Next, the processing control unit 160 transmits imaging instructions to the camera 130, and the camera 130 acquires a captured image (step S3). The processing control unit 160 analyzes the acquired captured image and determines whether or not the number of the license plate has been detected (step S4).

If the license plate number has not been detected (step S4/NO), the processing control unit 160 acquires the next captured image from the first storage unit 170 and continues to detect the license plate number (step S3).

If the license plate number has been detected (step S4/YES), the processing control unit 160 determines whether or not the detected license plate number matches the license plate number information 173 stored in the first storage unit 170 (step S5).

If the detected license plate number does not match the license plate number information 173 (step S5/NO), the processing control unit 160 acquires the next captured image from the first storage unit 170 and continues detection of the license plate number (step S3).

If the detected license plate number matches the license plate number information 173 (YES in step S5), the processing control unit 160 sets a coordinate system and calculates coordinates indicating the position of the information processing device 100 (step S6). The processing control unit 160 sets the center of the parked vehicle 5 as the origin of the coordinate system, and calculates coordinates indicating the position of the information processing device 100 in the set coordinate system.

Next, the processing control unit 160 determines whether or not route information has been received from the vehicle control device 270 (step S7). If the route information has not been received (step S7/NO), the processing control unit 160 stands by until the route information has been received.

If the route information has been received (step S7/YES), the processing control unit 160 generates a 3D vehicle image 6 based on the 3D image data 177, and the processing control unit 160 superimposes the generated 3D vehicle image 6 on the captured image to generate a display image 190. The processing control unit 160 displays the generated display image 190 on the touch panel 150 (step S8).

Next, the processing control unit 160 determines whether or not a button operation has been received (step S9). If the button operation has not been received (step S9/NO), the processing control unit 160 stands by until the button operation has been received.

When receiving a button operation (step S9/YES), the processing control unit 160 determines whether or not the received button operation is an operation of the change button 193 (step S10). If the received operation is an operation of the change button 193 (step S10/YES), the processing control unit 160 changes the display position of the 3D vehicle image 6 in accordance with the touch operation of the user (step S11). Thereafter, the processing control unit 160 returns to the determination of step S9.

If the received button operation is not an operation of the change button 193 (NO in step S10), the processing control unit 160 determines that the received button operation is an operation of the confirmation button 191, and transmits projection instructions and travel instructions to the vehicle control device 270 (step S12). The travel instructions include route information on a route along which the vehicle 5 travels and information on a stop position at which the vehicle 5 stops.

Next, the processing control unit 160 erases the display image 190 including the 3D vehicle image 6 displayed on the touch panel 150 (step S13), and displays the cancel button 195 on the touch panel 150 (step S14).

Next, the processing control unit 160 determines whether or not an operation of the cancel button 195 has been received (step S15). If an operation of the cancel button 195 has been received (step S15/YES), the processing control unit 160 transmits an instruction to stop the control of the vehicle 5 to the vehicle control device 270 (step S17) and ends the processing flow. When receiving the stop instruction of control of the vehicle 5 from the information processing device 100, the vehicle control device 270 instructs the drive control device 240 to stop control of the vehicle 5.

If an operation of the cancel button 195 has not been received (step S15/NO), the processing control unit 160 determines whether or not an arrival notification for notifying arrival at the stopping position has been received from the drive control device 240 (step S16).

If an arrival notification has not been received (step S16/NO), the processing control unit 160 returns to the determination of step S17. If the arrival notification has been received from the drive control device 240 (step S16/YES), the processing control unit 160 ends the processing flow.

Figure 10:
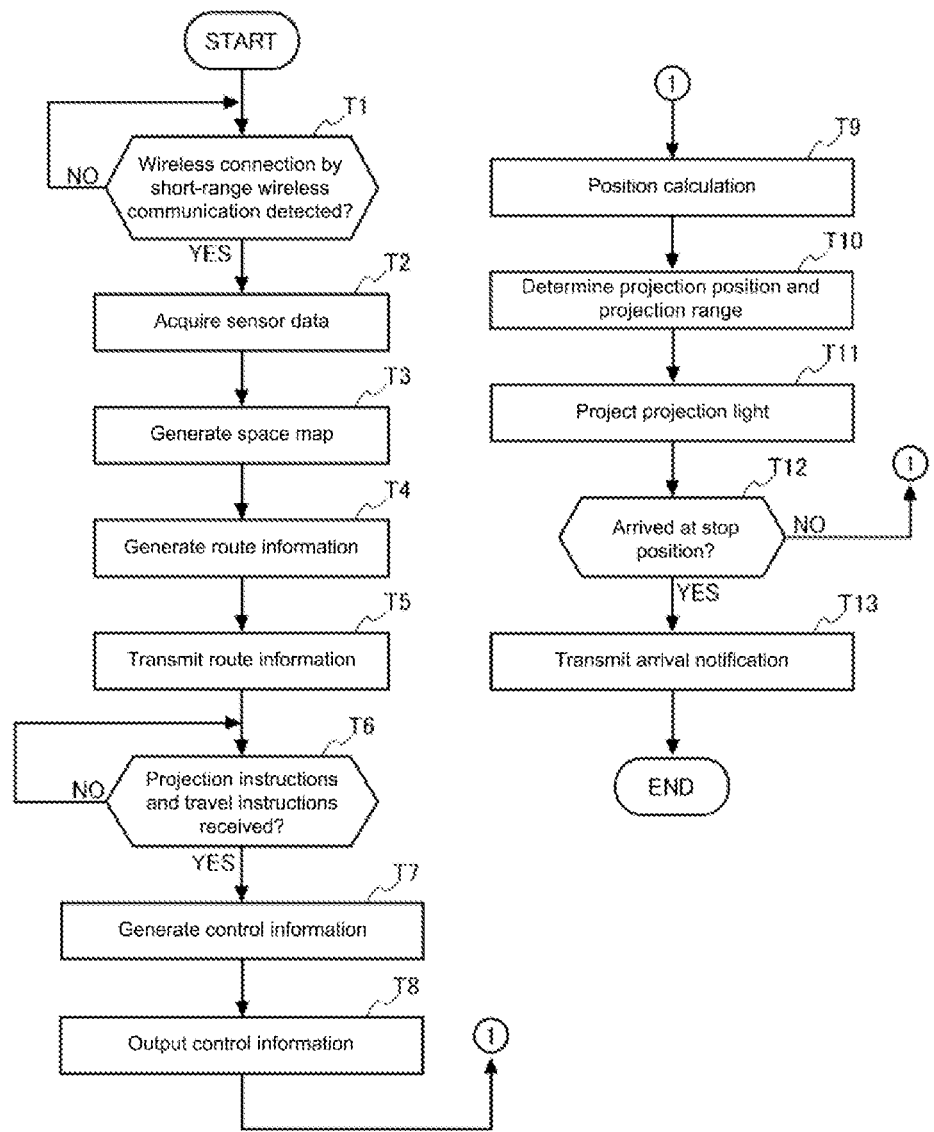
FIG. 10 is a flowchart showing an operation of a vehicle control device.

FIG. 10 is a flowchart showing the operation of the vehicle control device 270.

The operation of the vehicle control device 270 will be described with reference to the flowchart shown in FIG. 10.

First, the vehicle control device 270 determines whether or not wireless connection by short-range wireless communication has been detected (step T1). If the wireless connection has not been detected (step T1/NO), the vehicle control device 270 stands by until the wireless connection by the short-range wireless communication is detected.

If wireless connection by the short-range wireless communication has been detected (step T1/YES), the vehicle control device 270 transmits a sensing start instruction to the sensor group 230 and acquires the sensor data from the second storage unit 280 (step T2).

Next, the vehicle control device 270 generates a space map based on the acquired sensor data (step T3), and generates route information indicating a route along which the vehicle 5 leaves the parking position based on the generated space map (step T4). The vehicle control device 270 transmits the generated route information to the information processing device 100 (step T5).

Next, the vehicle control device 270 determines whether or not the projection instructions and the travel instructions have been received from the information processing device 100 (step T6). If the projection instructions and the travel instructions have not been received (step T6/NO), the vehicle control device 270 stands by until the projection instructions and the travel instructions have been received from the information processing device 100.

If the projection instructions and the travel instructions have been received from the information processing device 100 (step T6/YES), the vehicle control device 270 generates control information for causing the vehicle 5 to travel from the parking position to the stopping position based on the stopping position and the route information included in the received travel instructions (step T7). The vehicle control device 270 outputs the generated control information to the drive control device 240 (step T8). The drive control device 240 drives the drive device 250 based on the input control information. Thus, the vehicle 5 starts traveling.

Next, when the vehicle 5 starts traveling, the vehicle control device 270 calculates the position of the vehicle 5 based on the position information and the direction information input from the position detecting unit 220 and the sensor data of the steering angle sensor 231 and the vehicle speed sensor 233 (step T9).

Next, the vehicle control device 270 determines the projection position and the projection range where the projection light is projected based on the coordinates included in the received projection instructions (step T10). The vehicle control device 270 controls the drive unit 267 to project the projection light in the determined projection position and projection range (step T11).

Next, the vehicle control device 270 determines whether or not the vehicle 5 has arrived at the stopping position (step T12). If the vehicle 5 has not arrived at the stopping position (step T12/NO), the vehicle control device 270 returns to the processing of step T9 and recalculates the position of the vehicle 5. If the vehicle 5 arrives at the stopping position (step T12/YES), the vehicle control device 270 transmits an arrival notification to the information processing device 100 (step T13), and ends the processing flow.

[5. Effect]

As described above, the vehicle control device 270 of the present embodiment includes the route generating unit 294, the communication control unit 295, and the projection control unit 296.

The route generating unit 294 generates a vehicle parking lot leaving route based on a sensing result of the sensor group 230 mounted on the vehicle 5.

The communication control unit 295 transmits the parking lot leaving route to the information processing device 100 and receives the stop position at which the vehicle stops from the information processing device 100.

The projection control unit 296 projects the light emitted from the light source 261 at a position on the road surface corresponding to the stop position.

Accordingly, since the light emitted from the light source 261 is projected at the position on the road surface corresponding to the stop position, it is possible to accurately notify the stop position of the vehicle leaving a parking lot by autonomous driving.

The communication control unit 295 receives a change request for changing the stop position and the changed stop position from the information processing device 100.

The projection control unit 296 projects the light emitted from the light source 261 at a position on the road surface corresponding to the changed stop position.

Thereby, the stop position of the vehicle 5 can easily be reset. Since the light emitted from the light source 261 is projected even at the reset stop position, it is possible to accurately provide notification of the stop position of the vehicle leaving a parking lot by autonomous driving.

The projection control unit 296 projects the light emitted from the light source 261 to a position on the road surface corresponding to the stop position even when the vehicle 5 is traveling on the parking lot leaving route.

As a result, the stop position of the vehicle 5 can be notified to other people near the vehicle 5, and safety when leaving the parking lot can be enhanced.

The vehicle control system 1 includes an information processing device 100 in addition to the vehicle control device 270.

An information processing device 100 includes a touch panel 150 for receiving selection of a stop position for stopping a vehicle leaving a parking lot from a parking position based on a parking lot leaving route, and a processing control unit 160 for transmitting the stop position received by the touch panel 150 to a vehicle control device 270.

The stop position for stopping the vehicle leaving the parking lot from a parking position can be selected by the operation of the touch panel 150, and the stop position can be selected by a simple operation.

The information processing device 100 includes a camera 130.

The processing control unit 160 displays the display image 190 in which the 3D vehicle image 6 corresponding to the vehicle 5 is superimposed on the captured image generated by the camera 130 on the touch panel 150.

The touch panel 150 receives a change operation for changing the display position of the 3D vehicle image 6 in the display image 190.

The processing control unit 160 transmits the position of the 3D vehicle image 6 after the change by the change operation to the vehicle control device 270 as the stopping position.

Thus, the stopping position of the vehicle 5 leaving the parking lot from the parking position can be set while operating the 3D vehicle image 6 corresponding to the vehicle 5. Therefore, the state when the vehicle 5 actually stops at the stop position can be displayed on the touch panel 150, and the setting of the stop position by the information processing device 100 can be performed more accurately.

If the display position of the 3D vehicle image 6 after the change is not the position on the display image 190 corresponding to the parking lot leaving route even if the change operation has been received, the processing control unit 160 does not receive the change operation.

Thus, it is possible to prevent a route on which the vehicle 5 cannot travel from being selected due to an obstacle or the like.

The touch panel 150 receives the request for changing the stopping position and the changed position of the 3D vehicle image 6 on the display image 190. The processing control unit 160 transmits the change request and the changed stop position to the vehicle control device 270.

The communication control unit 295 receives the change request and the changed stop position from the information processing device 100.

The projection control unit 296 projects the light emitted from the light source 261 at a position on the road surface corresponding to the changed stop position.

Thereby, the stop position of the vehicle 5 can easily be reset. Since the light emitted from the light source 261 is projected even at the reset stop position, it is possible to accurately provide notification of the stop position of the vehicle leaving a parking lot by autonomous driving.

The above-described embodiment merely exemplifies one aspect of the present invention, and can be arbitrarily modified and applied without departing from the gist of the present invention.

For example, in the embodiment described above, the vehicle 5 of the user is specified by determining whether or not the license plate number detected from the captured image matches the license plate number information 173 stored in the first storage unit 170. As another form, the first storage unit 170 may store a vehicle image of a vehicle of a vehicle type, a color, or a model year corresponding to the vehicle 5, and may specify the vehicle 5 of the user by comparing the captured image of the camera 130 with the vehicle image.

A block diagram showing the configuration of the information processing device 100 shown in FIG. 2 is a schematic diagram showing components classified according to main processing contents in order to facilitate understanding of the present invention, but the components can also be classified into more components according to processing contents. In addition, one component can be classified so as to execute more processing.

The block diagram showing the configuration of the in-vehicle device 200 shown in FIG. 3 is a schematic diagram showing components classified according to main processing contents in order to facilitate understanding of the present invention, but the components can also be classified into more components according to processing contents. In addition, one component can be classified so as to execute more processing.

In addition, the processing units of the flowcharts illustrated in FIGS. 8 and 9 are divided according to the main processing content in order to facilitate understanding of the processing of the information processing device 100 and the vehicle control device 270, but the present invention is not limited by the method of dividing the processing units or the names thereof. The processing of the information processing device 100 and the vehicle control device 270 may be divided into more processing units according to the processing content. In addition, the processes of the information processing device 100 and the vehicle control device 270 may be divided such that one processing unit performs more processes.

DESCRIPTION OF SYMBOLS

1 Vehicle control system
5 Vehicle
6 3D vehicle image
100 Information processing device
200 In-vehicle device
230 Sensor group
270 Vehicle control device

What is claimed is:

1. A vehicle control system, comprising:
an information processing device including a first processor; and
a vehicle control device, including a second processor that includes:
  a route generating unit that generates a parking lot leaving route of a vehicle based on sensing results of a sensor mounted on the vehicle, and
  a communication control unit that transmits the parking lot leaving route to the information processing device, wherein
the information processing device includes an operating unit that is a touch panel and that receives selection of a stop position at which the vehicle that has left a parking lot from a parking position is stopped, based on the parking lot leaving route received,
the first processor includes a control unit that transmits the stop position received by the operating unit to the vehicle control device,
the second processor includes a projection control unit that determines a projection position and a projection range of light emitted from a light source onto a position on a road surface corresponding to the stop position,
the information processing device includes a camera generating a captured image and a display;
the control unit
  calculates coordinates indicating a position of the information processing device in a case where a center of the vehicle captured in the captured image is as a reference,
  obtains a 3D image data that is a three dimensional data for displaying a three dimensional image of a vehicle corresponding to the vehicle,
  generates, based on the 3D image data, a 3D vehicle image that is a three dimensional image of the vehicle,
  displays a display image where the 3D vehicle image generated is superimposed on the captured image generated by the camera on the display;
the operating unit receives a change operation for changing a display position of the 3D vehicle image in the display image;
the control unit transmits the display position of the 3D vehicle image changed by the change operation to the vehicle control device as the stop position; and
even if the change operation is received, if the display position of the 3D vehicle image changed by the change operation is not a position, on the display image, corresponding to the parking lot leaving route received, the control unit returns the display position of the 3D vehicle image changed by the change operation to a position before the change operation,
when receiving from the information processing device a projection instruction that is an instruction to project onto the road surface a projection light indicating the stop position, the second processor determines, based on the coordinates included in the received projection instruction, the projection position and the projection range where the projection light is projected.

2. The vehicle control system according to claim 1, wherein
the operating unit receives a change request of the stop position, and a changed stop position of the 3D vehicle image on the display image;
the control unit transmits the change request and the changed stop position to the vehicle control device;
the communication control unit receives the change request and the changed stop position from the information processing device; and
the projection control unit determines the projection position and the projection range of the light emitted from the light source at a position on the road surface corresponding to the changed stop position.

* * * * *